United States Patent
Waid et al.

(10) Patent No.: US 9,556,367 B2
(45) Date of Patent: Jan. 31, 2017

(54) BLENDS OF BLOCK COPOLYMER AND ACRYLIC ADHESIVES

(71) Applicant: 3M INNOVATIVE PROPERTIES COMPANY, St. Paul, MN (US)

(72) Inventors: Robert D. Waid, Oakdale, MN (US); Panu K. Zoller, River Falls, WI (US); Gregory B. Gadbois, Woodville, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 101 days.

(21) Appl. No.: 14/484,952

(22) Filed: Sep. 12, 2014

(65) Prior Publication Data
US 2014/0377533 A1 Dec. 25, 2014

Related U.S. Application Data

(63) Continuation of application No. 12/514,865, filed as application No. PCT/US2007/083741 on Nov. 6, 2007, now abandoned.
(Continued)

(51) Int. Cl.
*C09J 153/02* (2006.01)
*C09J 133/08* (2006.01)
(Continued)

(52) U.S. Cl.
CPC ............ *C09J 153/02* (2013.01); *B29C 35/10* (2013.01); *B29C 47/0064* (2013.01); *B29C 47/065* (2013.01); *B32B 3/26* (2013.01); *B32B 7/12* (2013.01); *B32B 27/06* (2013.01); *B32B 27/065* (2013.01); *C09J 7/0289* (2013.01); *B29K 2009/00* (2013.01); *B29K 2025/00* (2013.01); *B29K 2033/12* (2013.01); *B29K 2096/04* (2013.01); *B29K 2105/0002* (2013.01); *B29K 2105/0085* (2013.01); *B29K 2105/0097* (2013.01); *B29L 2009/00* (2013.01);
(Continued)

(58) Field of Classification Search
None
See application file for complete search history.

(56) References Cited

U.S. PATENT DOCUMENTS

| 4,167,433 A | 9/1979 | Lakshmanan |
| 5,141,789 A | 8/1992 | Matsuzawa et al. |

(Continued)

FOREIGN PATENT DOCUMENTS

| EP | 0025004 | 3/1981 |
| EP | 0653449 | 5/1995 |

(Continued)

OTHER PUBLICATIONS

Handbook of Polymer Foams, David Eaves, editor, published by Shawbury, Shrewsbury, Shropshire, UK: Rapra Technology, 2004.
ASTM Standard D2578.

*Primary Examiner* — Frank D Ducheneaux
(74) *Attorney, Agent, or Firm* — Thomas M. Spielbauer; Dena M. Enrich; Philip Y. Dahl (57) ABSTRACT

Pressure sensitive adhesive compositions containing 92 to 99.9 parts of a block copolymer adhesive composition and 0.1 to less than 8 parts of an acrylic adhesive composition are described. Tapes including such adhesives, and methods of making such tapes are also described.

19 Claims, 1 Drawing Sheet

Related U.S. Application Data (60) Provisional application No. 60/868,975, filed on Dec. 7, 2006.

(51) Int. Cl.

| | | |
|---|---|---|
| *C09J 133/14* | (2006.01) | |
| *C08L 33/06* | (2006.01) | |
| *C08L 33/14* | (2006.01) | |
| *C08L 53/02* | (2006.01) | |
| *B29C 35/10* | (2006.01) | |
| *B23B 3/26* | (2006.01) | |
| *C09J 7/02* | (2006.01) | |
| *B29C 47/00* | (2006.01) | |
| *B29C 47/06* | (2006.01) | |
| *B32B 3/26* | (2006.01) | |
| *B32B 7/12* | (2006.01) | |
| *B32B 27/06* | (2006.01) | |
| *B29K 9/00* | (2006.01) | |
| *B29K 25/00* | (2006.01) | |
| *B29K 33/00* | (2006.01) | |
| *B29K 96/04* | (2006.01) | |
| *B29K 105/00* | (2006.01) | |
| *B29L 9/00* | (2006.01) | |

(52) U.S. Cl.
CPC ....... *B32B 2250/02* (2013.01); *B32B 2250/03* (2013.01); *B32B 2250/04* (2013.01); *B32B 2270/00* (2013.01); *B32B 2405/00* (2013.01); *C08L 33/06* (2013.01); *C08L 33/14* (2013.01); *C08L 53/02* (2013.01); *C08L 2205/02* (2013.01); *C09J 133/08* (2013.01); *C09J 133/14* (2013.01); *C09J 2433/00* (2013.01); *C09J 2433/006* (2013.01); *C09J 2453/00* (2013.01); *Y10T 428/249983* (2015.04); *Y10T 428/249985* (2015.04); *Y10T 428/31855* (2015.04); *Y10T 428/31931* (2015.04)

(56) References Cited

U.S. PATENT DOCUMENTS

| | | | |
|---|---|---|---|
| 5,292,819 A | 3/1994 | Diehl et al. | |
| 5,296,547 A | 3/1994 | Nestegard et al. | |
| 5,372,870 A | 12/1994 | Diehl et al. | |
| 5,393,373 A | 2/1995 | Jun et al. | |
| 5,399,627 A | 3/1995 | Diehl et al. | |
| 5,523,343 A | 6/1996 | Giordano et al. | |
| 5,602,202 A | 2/1997 | Groves | |
| 5,605,964 A | 2/1997 | Groves | |
| 5,663,241 A | 9/1997 | Takamatsu et al. | |
| 5,677,376 A | 10/1997 | Groves | |
| 5,750,623 A | 5/1998 | Diehl et al. | |
| 5,795,834 A * | 8/1998 | Deeb | B32B 7/12 |
| | | | 428/343 |
| 5,896,855 A * | 4/1999 | Hobbs | A61M 15/0028 |
| | | | 128/203.12 |
| 5,948,527 A | 9/1999 | Gerard et al. | |
| 6,103,152 A | 8/2000 | Gehlsen et al. | |
| 6,162,851 A | 12/2000 | Wood et al. | |
| 6,162,859 A | 12/2000 | Lu et al. | |
| 6,204,350 B1 | 3/2001 | Liu et al. | |
| 6,503,621 B1 | 1/2003 | Ma et al. | |
| 6,579,941 B1 | 6/2003 | Sasaki et al. | |
| 6,630,531 B1 | 10/2003 | Khandpur et al. | |
| 6,632,522 B1 | 10/2003 | Hyde et al. | |
| H2100 H | 4/2004 | Hansen et al. | |
| 6,780,484 B2 | 8/2004 | Kobe et al. | |
| 6,805,933 B2 | 10/2004 | Patel et al. | |
| 6,835,422 B2 | 12/2004 | Kobe et al. | |
| 6,987,142 B2 | 1/2006 | St. Clair et al. | |
| 7,070,051 B2 | 7/2006 | Kanner et al. | |
| 7,078,093 B2 | 7/2006 | Sheridan et al. | |
| 7,084,209 B2 | 8/2006 | Everaerts et al. | |
| 7,589,152 B2 | 9/2009 | DuBois | |
| 7,655,720 B2 | 2/2010 | He et al. | |
| 2001/0019764 A1 | 9/2001 | Bries et al. | |
| 2001/0019766 A1 | 9/2001 | Masuda et al. | |
| 2002/0045043 A1 | 4/2002 | Kuniya et al. | |
| 2003/0211308 A1 | 11/2003 | Khandpur et al. | |
| 2004/0116582 A1 | 6/2004 | De Keyzer et al. | |
| 2005/0228114 A1 | 10/2005 | Gelles | |
| 2005/0234195 A1 | 10/2005 | St. Clair et al. | |
| 2006/0177652 A1 | 8/2006 | Khandpur et al. | |
| 2008/0311332 A1 * | 12/2008 | Sakurai | C09J 151/00 |
| | | | 428/41.3 |

FOREIGN PATENT DOCUMENTS

| | | |
|---|---|---|
| EP | 0711795 | 5/1996 |
| JP | H06-228522 | 8/1994 |
| JP | 8-253744 | 10/1996 |
| JP | 9-53059 | 2/1997 |
| KR | 10-0235818 | 12/1999 |
| WO | 92/20725 | 11/1992 |
| WO | 95/02640 | 1/1995 |
| WO | 96/25469 | 8/1996 |
| WO | 97/23249 | 3/1997 |
| WO | 01/51751 | 8/2001 |
| WO | 03/027182 | 4/2003 |
| WO | 2008/073669 | 6/2008 |

\* cited by examiner

*Fig. 1*

*Fig. 2*

BLENDS OF BLOCK COPOLYMER AND ACRYLIC ADHESIVES

FIELD

The present disclosure relates to block copolymer-based adhesives. Particularly, acrylic modified, block copolymer pressure sensitive adhesives.

BACKGROUND

Adhesives and tapes are commonly used to bond two substrates together to form a bonded composite. While a vast array of adhesives and tapes are available, advances in substrates and end use requirements continues to drive a need for new adhesive formulations and tape constructions. In addition to performance properties, environmental regulations and processing costs also influence product formulation requirements. For example, in some applications it may be desirable to use a hot melt adhesive rather than a solvent-based adhesive.

While some efforts are directed at the identification and development of new materials for use in adhesive formulations, much progress can still be made by identifying, selecting, and combining the proper proportions of existing raw materials to arrive at useful adhesives and tapes.

SUMMARY

Briefly, in one aspect, the present disclosure provides a pressure sensitive adhesive composition comprising 92 to 99.9 parts of a block copolymer adhesive composition and 0.1 to less than 10 parts of an acrylic adhesive composition. The block copolymer adhesive composition comprises a first block copolymer comprising (i) at least one rubbery block comprising a first polymerized conjugated diene, a hydrogenated derivative thereof, or combinations thereof; and (ii) at least one glassy block comprising a first polymerized monovinyl aromatic monomer. The acrylic adhesive composition comprises 70 to 100 parts of at least one acrylic or methacrylic ester of a non-tertiary alkyl alcohol, wherein the non-tertiary alkyl alcohol contains 4 to 20 carbon atoms; and 0 to 30 parts of a copolymerized reinforcing monomer.

In some embodiments, the first block copolymer is a multi-arm block copolymer of the formula $Q_n$-Y, wherein Q represents an arm of the multi-arm block copolymer, n represents the number of arms and is a whole number of at least 3; and Y is the residue of a multifunctional coupling agent. Each arm, Q, independently has the formula R-G wherein R represents the rubbery block; and G represents the glassy block. In some embodiments, the first block copolymer is a polymodal, asymmetric star block copolymer.

In some embodiments, the pressure sensitive adhesive further comprises a second block copolymer comprising at least one rubbery block comprising a polymerized second conjugated diene, a hydrogenated derivative thereof, or combinations thereof; and at least one glassy block comprising a second polymerized monovinyl aromatic monomer. In some embodiments, the second block copolymer is a linear block copolymer.

In some embodiments, the pressure sensitive adhesive further comprises a first high Tg tackifier having a Tg of at least 60 degrees C., wherein the first high Tg tackifier is compatible with at least one rubbery block. In some embodiments, the block copolymer adhesive composition further comprises a second high Tg tackifier having a Tg of at least 60 degrees C., wherein the second high Tg tackifier is compatible with the at least one glassy block.

In some embodiments, the pressure sensitive adhesive is a hot melt adhesive. In some embodiments, the pressure sensitive adhesive is a solvent-based adhesive.

In another aspect, the present disclosure provides a tape comprising a foam backing having a first major surface and a second major surface; and a first adhesive skin bonded to the first major surface, wherein the first adhesive skin comprises a first pressure sensitive adhesive according to any one of the preceding claims. In some embodiments, the tape further comprises a second adhesive skin bonded to the second major surface.

In some embodiments, the backing is a foam backing. In some embodiments, the foam comprises a thermoplastic foam. In some embodiments, the foam comprises a thermoset foam.

In yet another aspect, the present disclosure provides a method of making a tape. In some embodiments, the method comprises extruding a foam backing and coextruding a first pressure sensitive adhesive to form the first adhesive skin bonded to the first major surface of the foam backing. In some embodiments, the method further comprises extruding a second adhesive to form a second adhesive skin bonded to the second major surface of the foam backing.

In some embodiments, the method comprises providing a foam backing, and applying a first adhesive composition comprising the first pressure sensitive adhesive to the first surface of the foam backing. In some embodiments, applying the first adhesive composition comprises laminating.

In some embodiments, applying the first adhesive composition comprises coating, optionally wherein the method further comprises crosslinking the first adhesive composition, optionally wherein crosslinking the first adhesive composition comprises radiation crosslinking.

In another aspect, the present disclosure provides a bonded composite comprising a first substrate having a first surface; a second substrate having a second surface; and a bonding interface between the first surface of the first substrate and the second surface of the second substrate, wherein the bonding interface comprises a pressure sensitive adhesive according to the present disclosure. In some embodiments, the first surface has a surface energy of less than 35 dyne per centimeter.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

In one aspect, the present disclosure provides a pressure sensitive adhesive composition comprising both a block copolymer adhesive composition and an acrylic adhesive composition. In some embodiments, the pressure sensitive adhesive further comprises one or more additional block copolymers, one or more tackifiers, other additives, and combinations thereof.

In some embodiments, the pressure sensitive adhesive composition comprises at least about 90 parts, and in some embodiments, at least about 92 parts, and in some embodiments, at least about 96 parts of a block copolymer adhesive composition. In some embodiments, the pressure sensitive adhesive composition comprises no greater than about 99.9 parts, and in some embodiments, no greater than about 99 parts, or even no greater than about 98 parts of a block copolymer adhesive composition. In some embodiments, the pressure sensitive adhesive composition comprises 92 to 99.9 parts and, in some embodiments, 96 to 99 parts of a block copolymer adhesive composition.

The first block copolymer comprises a rubbery block, R, and at least one glassy block, G. In some embodiments, the first block copolymer comprises at least three glassy blocks. In some embodiments, the first block copolymer comprises between three and five glassy blocks, inclusive. In some embodiments, the first block copolymer comprises four glassy blocks.

In some embodiments, the first block copolymer is a multi-arm block copolymer having the general formula $Q_n$-Y, wherein Q represents an arm of the multi-arm block copolymer; n represents the number of arms and is a whole number of at least 3; and Y is the residue of a multifunctional coupling agent. Each arm, Q, independently has the formula R-G, wherein G represents the glassy block; and R represents the rubbery block.

Generally, a rubbery block exhibits a glass transition temperature (Tg) of less than room temperature. In some embodiments, the Tg of the rubbery block is less than about 0° C., or even less than about −10° C. In some embodiments, the Tg of the rubbery block is less than about −40° C., or even less than about −60° C.

Generally, a glassy block exhibits a Tg of greater than room temperature. In some embodiments, the Tg of the glassy block is at least about 40° C., at least about 60° C., at least about 80° C., or even at least about 100° C.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof.

In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In the general formula for some multi-arm block copolymers of the present disclosure, $Q_n$-Y, n represents the number of arms and is a whole number of at least 3, i.e., the multi-arm block copolymer is a star block copolymer. In some embodiments, n is ranges from 3-10. In some embodiments, n ranges from 3-5. In some embodiments, n is 4. In some embodiments, n is equal to 6 or more.

In some embodiments, the first block copolymer is a polymodal block copolymer. As used herein, the term "polymodal" means that the copolymer comprises glassy blocks having at least two different molecular weights. Such a block copolymer may also be characterized as having at least one "high" molecular weight glassy block, and at least one "low" molecular weight glassy block, wherein the terms high and low are used relative to each other. In some embodiments the ratio of the number average molecular weight of the high molecular weight glassy block, $(Mn)_H$, relative to the number average molecular weight of the low molecular weight glassy block, $(Mn)_L$, is at least about 1.25.

In some embodiments, $(Mn)_H$ ranges from about 5,000 to about 50,000. In some embodiments, $(Mn)_H$ is at least about 8,000, and in some embodiments at least about 10,000. In some embodiments, $(Mn)_H$ is no greater than about 35,000. In some embodiments, $(Mn)_L$ ranges from about 1,000 to about 10,000. In some embodiments, $(Mn)_L$ is at least about 2,000, and, in some embodiments, at least about 4,000. In some embodiments, $(Mn)_L$ is less than about 9,000, and, in some embodiments, less than about 8,000.

In some embodiments, the first block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the glassy blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

In some embodiments, the pressure sensitive adhesive compositions of the present disclosure comprise at least about 0.1 parts, in some embodiments, at least about 0.5 parts, at least about 1 part, or even at least about 2 parts of an acrylic adhesive composition. In some embodiments, the pressure sensitive adhesive compositions of the present disclosure comprise no greater than about 10 parts, in some embodiments, no greater than about 8 parts, no greater than about 5 parts, or even no greater than about 4 parts an acrylic adhesive composition.

In some embodiments, the non-tertiary alkyl alcohol contains 4 to 20 carbon atoms. Exemplary acrylic acid esters include isooctyl acrylate, 2-ethylhexyl acrylate, butyl acrylate, isobornyl acrylate, and combinations thereof. Exemplary methacrylic acid esters include the methacrylate analogues of these acrylic acid esters.

In some embodiments, the acrylic adhesive composition comprises the reaction product of at least one acrylic or methacrylic ester of a non-tertiary alkyl alcohol and, optionally, at least one copolymerized reinforcing monomer. In some embodiments, the acrylic adhesive composition comprises at least about 70 parts, in some embodiments, at least about 80 parts, at least about 90 parts, at least about 95 parts, or even about 100 parts of at least one acrylic or methacrylic ester of a non-tertiary alkyl alcohol. In some embodiments, acrylic adhesive composition comprises no greater than about 30 parts, in some embodiments, no greater than about 20 parts, no greater than about 10 parts, no greater than about 5 parts, and even no greater than 1 part of at least one copolymerized reinforcing monomer. In some embodiments, the acrylic adhesive composition does not include a copolymerized reinforcing monomer.

In some embodiments, the copolymerized reinforcing monomer is selected from the group consisting of acrylic acid, methacrylic acid, 2-carboxyethyl acrylate, N,N' dimethyl acrylamide, N,N' diethyl acrylamide, butyl carbamoyl ethyl acrylate, and combinations thereof.

In some embodiments, the block copolymer adhesive composition comprises a second block copolymer. In some embodiments, the second block copolymer may be a linear block copolymer. A linear block copolymer can be described by the formula $$R\text{-}(G)_m$$

wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

In some embodiments, the rubbery block of the second block copolymer comprises a polymerized conjugated diene, a hydrogenated derivative thereof, or combinations thereof. In some embodiments, the conjugated dienes comprise 4 to 12 carbon atoms. Exemplary conjugated dienes useful in the second block copolymer include any of the exemplary conjugated dienes described above.

In some embodiments, at least one glassy block, and in some embodiments, each glassy block of the second block copolymer comprises a polymerized monovinyl aromatic monomer. In some embodiments, the monovinyl aromatic monomers comprise 8 to 18 carbon atoms. Exemplary polymerized monovinyl aromatic monomers useful in the second block copolymer include any of the exemplary polymerized monovinyl aromatic monomer, as described above.

In some embodiments, block copolymer adhesive compositions of the present disclosure comprise a first high Tg tackifier having a glass transition temperature (Tg) of at least 60 degrees Celsius (° C.). As used herein, the terms "high glass transition temperature tackifier" and "high Tg tackifier" refers to a tackifier having a glass transition temperature of at least 60° C. In some embodiments, the first high Tg tackifier has a Tg of at least 65° C., or even at least 70° C. In some embodiments, the first high Tg tackifier has a softening point of at least about 115° C., and, in some embodiments, at least about 120° C.

The first high Tg tackifier is primarily compatible with the rubbery block of the first block copolymer. In some embodiments, the first high Tg tackifier is also compatible with the rubbery block of the second block copolymer. In some embodiments, the first high Tg tackifier is primarily compatible with the rubbery block of the first and, optionally, the second block copolymer.

As used herein, a tackifier is "compatible" with a block if it is miscible with that block. Generally, the miscibility of a tackifier with a block can be determined by measuring the effect of the tackifier on the Tg of that block. If a tackifier is miscible with a block it will alter (e.g., increase) the Tg of that block.

A tackifier is "primarily compatible" with a block if it is at least miscible with that block, although it may also be miscible with other blocks. For example, a tackifier that is primarily compatible with a rubbery block will be miscible with the rubbery block, but may also be miscible with a glassy block.

Generally, resins having relatively low solubility parameters tend to associate with the rubbery blocks; however, their solubility in the glassy blocks tends to increase as the molecular weights or softening points of these resins are lowered. Exemplary tackifiers that are primarily compatible with the rubbery blocks include polymeric terpenes, heterofunctional terpenes, coumarone-indene resins, esters of rosin acids, disproportionated rosin acid esters, hydrogenated rosin acids, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

In some embodiments, the block copolymer adhesive compositions include a second high Tg tackifier that is primarily compatible with the glassy block(s) of the first block copolymer and, optionally, with the glassy block(s) of the second block copolymer. Generally, a tackifier that is primarily compatible with a glassy block is miscible with the glassy block and may be miscible with a rubbery block.

Generally, resins having relatively high solubility parameters tend to associate with the glassy blocks; however, their solubility in the rubbery blocks tends to increase as the molecular weights or softening points of these resins are lowered. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the pressure sensitive adhesives of the present disclosure further comprise at least one component selected from the group consisting of a low Tg tackifier, a plasticizer, and combinations thereof. As used herein, the term "low glass transition temperature tackifier" refers to a tackifier having a glass transition temperature of less than 60° C. Exemplary low Tg tackifiers include polybutenes.

Generally, a plasticizer is compatible with one or more blocks of the linear block copolymer, and/or one or more blocks of the multi-arm block copolymer. Generally, a plasticizer that is compatible with a block will be miscible with that block and will lower the Tg of that block. Exemplary plasticizers include naphthenic oils, liquid polybutene resins, polyisobutylene resins, and liquid isoprene polymers.

In some embodiments, the ratio of multi-arm block copolymers to linear block copolymers ranges from 1.5:1 to 9:1. In some embodiments, the ratio of multi-arm block copolymers to linear block copolymer is at least 1.85:1, or even at least 3:1. In some embodiments, the ratio of multi-arm block copolymers to linear block copolymers is no greater than 5.7:1, or even no greater than 4:1.

In some embodiments, the ratio of the total amount of high glass transition temperature tackifiers to block copolymers ranges from 0.8:1 to 1.25:1. In some embodiments, the ratio of the total amount of high Tg tackifiers to block copolymers is at least 0.85:1, or even at least 0.9:1. In some embodiments, the ratio of the total amount of high Tg tackifiers to block copolymers is no greater than 1.15:1, or even no greater that 1.1 to 1.

In some embodiments, the ratio of the rubbery block compatible high Tg tackifier to the glassy block compatible high Tg tackifier is ranges from 1:1 to 9:1. In some embodiments, the ratio of the rubbery block compatible high Tg tackifier to the glassy block compatible high Tg tackifier is at least 1.25:1, or even at least 1.5:1. In some embodiments the ratio of the rubbery block compatible high Tg tackifier to the glassy block compatible high Tg tackifier is no greater than 4:1, or even no greater than 3:1.

In some embodiments, the ratio of the combination of the block copolymers and high Tg tackifiers to the acrylate component is at least 8.3:1. In some embodiments, the ratio of the combination of the block copolymers and high Tg tackifiers to the acrylate component is at least 12.5:1, at least 22:1, at least 90:1, or even at least 180:1. In some embodiments, the pressure sensitive adhesive comprises no greater than 10% by weight of the acrylate component, in some embodiments, no greater than 8%, no greater than 4%, no greater than 1% or even no greater than 0.5% by weight.

In some embodiments, the ratio of the combination of the block copolymers, high Tg tackifiers, and acrylate component to the liquid plasticizer ranges from 32:1 to 10:1. In some embodiments, the ratio of the combination of the block copolymers, high Tg tackifiers, and acrylate component to the liquid plasticizer is no great than 25:1, or even no greater than 20:1. In some embodiments, the ratio of the combination of the block copolymers, high Tg tackifiers, and acrylate component to the liquid plasticizer is at least 12.5:1.

In some embodiments, the pressure sensitive adhesive of the present disclosure is a hot melt adhesive. As used herein, a hot melt adhesive is a polymer or blended polymeric material with a melt viscosity profile such that it can be coated on a substrate or carrier in a thin layer at a process temperature significantly above normal room temperature, but retains useful pressure-sensitive adhesive characteristics at room temperature.

The pressure-sensitive adhesive compositions of the present invention can be made using methods known in the art. For example, they can be made by dissolving the block copolymers, suitable tackifiers, any plasticizer(s), and any other additives in a suitable solvent, and coating onto a substrate (e.g., release liner, tape backing, core, or panel) using conventional means (e.g., knife coating, roll coating, gravure coating, rod coating, curtain coating, spray coating, air knife coating). In some embodiments, the pressure-sensitive adhesive is prepared in a substantially solvent-free process (i.e., the adhesive contain no greater than about 20 wt. % solvent, in some embodiments, no greater than about 10 wt. % solvent and, in some embodiments, no greater than about 5 wt. % solvent, in some embodiments, no greater than 1 wt. % solvent, or even no greater than trace amounts of solvent (i.e., essentially no solvent). Such substantially solvent-free processes are known and include, e.g., compounding by calendaring or roll milling, and extruding (e.g., single. screw, twin screw, disk screw, reciprocating single screw, pin barrel single screw, etc.). Commercially available equipment such as BRABENDER or BANBURY internal mixers are also available to batch mix the adhesive compositions. After compounding, the adhesive may be coated through a die into a desired form, such as a layer of adhesive, or it may be collected for forming at a later time.

In another aspect, the present disclosure provides a tape comprising a backing and a pressure sensitive skin adhesive bonded to at least one major surface of the backing. In some embodiments, the tape comprises a core and a skin adhesive bonded to both major surfaces of the core, wherein at least one skin adhesive is a pressure sensitive adhesive. In some embodiments, both skin adhesives are pressure sensitive adhesives. In some embodiments, both skin adhesives are the same adhesive. In some embodiments, the skin adhesives are different adhesives.

As used herein, the term "core" may be used interchangeably with the term "backing" when referring to a double-sided tape construction, i.e., a tape construction having an adhesive layer on both major surfaces of the backing or core.

At least one skin adhesive of the tapes of the present disclosure is a pressure sensitive adhesive comprising a blend of a block copolymer adhesive composition and an acrylic adhesive composition, as described herein. In some embodiments, the second skin adhesive may be a heat-activated adhesive. In some embodiments, both skin adhesives are pressure sensitive adhesives comprising a blend of a block copolymer adhesive composition and an acrylic adhesive composition, as described herein.

In some embodiments, one or more of the skin adhesive may be directly bonded to a major surface of a backing or core. In some embodiments, one or more of the skin adhesives may be indirectly bonded to a major surface of a backing or core. In some embodiments, e.g., a primer layer may be interposed between the skin adhesive and the major surface. Useful primers are generally known and include, e.g., the primers described in U.S. Pat. No. 5,677,376 (Groves) and U.S. Pat. No. 5,605,964 (Groves).

Any known backing or core may be used. Exemplary backings include papers and polymeric films (e.g., polyethylene, polyurethane, polyester, and polypropylene), metal foils, and woven and non-woven webs. In some embodiments, a backing or core comprising a foam may be used, e.g., open cell foams or closed cell foams. In some embodiments, the foam may comprise thermoplastic foam. In some embodiments, the foam may comprise a thermoset foam. Exemplary foams include acrylic foams, polyethylene foams, and polyurethane foams. Exemplary foams are also described in, e.g., the *Handbook of Polymer Foams*, David Eaves, editor, published by Shawbury, Shrewsbury, Shropshire, UK: Rapra Technology, 2004.

Figure 1:
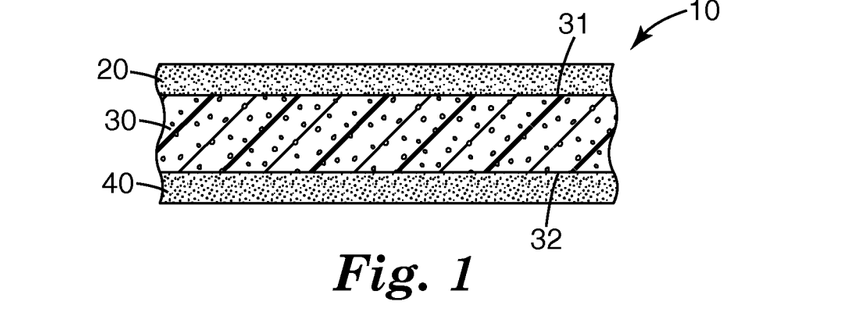
FIG. 1 illustrates a tape according to some embodiments of the present disclosure.

Referring to FIG. 1, exemplary tape 10, according to some embodiments of the present disclosure, comprises backing (or core) 30 and two adhesive layers. First adhesive layer 20 is bonded to first major surface 31 of backing 30, while second adhesive layer 40 is bonded to second major surface 32 of backing 30. As shown in FIG. 1, both first adhesive layer 20 and second adhesive layer 40 are directly bonded a major surface of backing 30. In some embodiments, one or both adhesive layer may be indirectly bonded to backing 30. For example, in some embodiments, one or more additional layers (e.g., primers, adhesion promoting layers, films, webs, scrims, and the like) may be interposed between the backing and an adhesive layer.

In another aspect, the present disclosure provides a bonded composite. As used herein, a bonded composite comprises a first substrate having a first major surface and a second substrate having a first major surface, wherein the first major surface of the first substrate is bonded to the first major surface of the second substrate via a bonding interface. In the bonded composites of the present disclosure, the bonding interface comprises a core having a first skin adhesive bonded to the first major surface of the core and a second skin adhesive bonded to the second major surface of the core. At least one skin adhesive of the bonding interface of the present disclosure is a pressure sensitive adhesive comprising a blend of a block copolymer adhesive composition and an acrylic adhesive composition, as described herein. In some embodiments, both skin adhesives are pressure sensitive adhesives comprising a blend of a block copolymer adhesive composition and an acrylic adhesive composition, as described herein.

In some embodiments, the first substrate comprises metal, glass, ceramic, or polymeric materials, and combinations thereof. In some embodiments, the first substrate includes a primed, painted, or polymeric surface. In some embodiments, the painted surface may comprise an automotive paint or clearcoat.

In some embodiments, the first major surface of the first substrate is a low surface energy surface. As used herein, a low surface energy surface means a surface with a measured surface energy below approximately 35 dyne per centimeter. The surface energy of a surface may be tested according to ASTM Standard D2578. Suitable test kits include, e.g., the ACCU-DYNE surface wetability kit, available from Diversified Enterprises, Claremont, N.H.

In some embodiments, the second substrate comprises metal, glass, ceramic, or polymeric materials, and combinations thereof. In some embodiments, the second substrate includes a primed, painted, or polymeric surface. In some embodiments, the painted surface may comprise an automotive paint or clearcoat. In some embodiments, the first major surface of the second substrate is a low surface energy surface.

In some embodiments, the core of the bonding interface comprises a foam, e.g., an open cell foams or a closed cell foams. In some embodiments, the foam comprises a thermoplastic foam. In some embodiments, the foam comprises a thermoset foam. In some embodiments, the foam comprises an acrylic foam. In some embodiments, the foam is a flexible foam. Generally, a flexible foam is a foam which, when in sheet form, can be bent back upon itself with out fracturing. Exemplary foams are described in, e.g., the Handbook of Polymer Foams, David Eaves, editor, published by Shawbury, Shrewsbury, Shropshire, UK: Rapra Technology, 2004.

Figure 2:
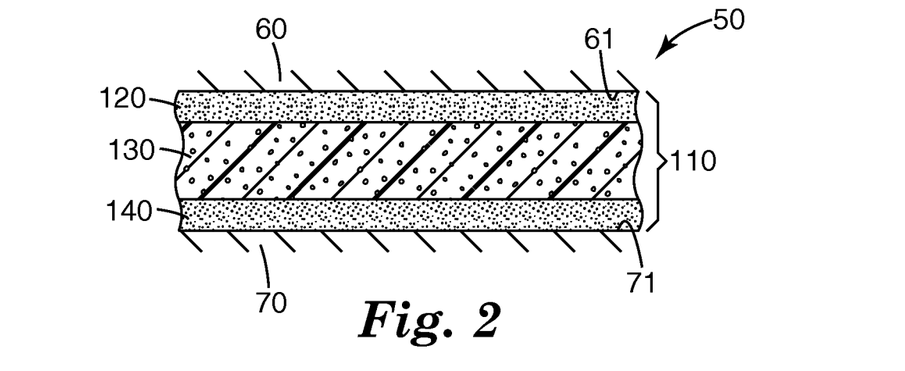
FIG. 2 illustrates a bonded composite according to some embodiments of the present disclosure.

Referring to FIG. 2, exemplary bonded composite 50, according to some embodiments of the present disclosure, comprises first substrate 60 bonded to second substrate 70 via bonding interface 110. Bonding interface 110 comprises a tape comprising backing (or core) 130 and two adhesive layers. First adhesive layer 120 is bonded to a first major surface of backing 130, while second adhesive layer 140 is bonded to a second major surface of backing 130. As shown in FIG. 2, both first adhesive layer 120 and second adhesive layer 140 are directly bonded a major surface of backing 130. In some embodiments, one or both adhesive layer may be indirectly bonded to backing 130.

As shown in FIG. 2, in some embodiments, first adhesive layer 120 is bonded directly to major surface 61 of first substrate 60. Similarly, in some embodiments, second adhesive layer 140 is directly bonded to major surface 71 of second substrate 70. In some embodiments, one or both adhesive layers may be indirectly bonded to a major surface of a substrate. For example, in some embodiments, one or more additional layers (e.g., primers, adhesion promoting layers, films, webs, scrims, and the like) may be interposed between an adhesive layer and a substrate.

In another aspect, the present disclosure provides methods of making a tape comprising a backing or a core, wherein the backing or the core comprises a foam, such as those described above. The tape comprises at least one skin adhesive, wherein at least one skin adhesive is a pressure sensitive adhesive comprising a blend of a block copolymer adhesive composition and an acrylic adhesive composition, as described herein.

In some embodiments, the method comprises extruding a foam. In some embodiments, the method further comprises extruding at least one skin adhesive. In some embodiments, the foam and at least one skin adhesive are co-extruded. Methods of extruding polymeric foams and methods of coextruding polymer foams and skin adhesives are described, e.g., in U.S. Pat. No. 6,103,152 (Gehlsen et al.) and U.S. Pat. No. 6,630,531 (Khandpur et al.), both of which are assigned to the present assignee, and are herein incorporated by reference in their entireties.

In some embodiments, the method of making foam core tapes comprises extruding a foam core and coextruding a first pressure sensitive adhesive as described herein to form a first adhesive skin bonded to the first major surface of the foam core. In some embodiments, the method further comprises extruding a second adhesive to form a second adhesive skin bonded to the second major surface of the foam core.

In some embodiments, the method of making foam core tapes comprises providing the foam core, which may have been produced by extrusion or any other known means, and applying a first adhesive composition comprising a first pressure sensitive adhesive as described herein to the first surface of the foam core. The first adhesive composition may be applied by, e.g., laminating or coating (e.g., knife coating, roll coating, gravure coating, rod coating, curtain coating, spray coating, or air knife coating).

In some embodiments, the second adhesive may be independently extruded or co-extruded with the foam and/or the first adhesive. In some embodiments, the second adhesive may be applied to the foam core by, e.g., laminating or coating.

In some embodiments, the first and/or second adhesive may be cured. Any known curing processes may be used, e.g., thermal curing and radiation curing. In some embodiments, one or both adhesives may crosslinked via exposure to actinic radiation, e.g., electron beam radiation or ultraviolet radiation.

The following specific, but non-limiting, examples will serve to illustrate the invention. In these examples, all percentages are parts by weight unless otherwise indicated.

TABLE 1

Summary of materials

| | | |
|---|---|---|
| AA | acrylic acid | |
| BA | butyl acrylate | |
| EA | ethyl acrylate | |
| IOA | isooctyl acrylate | |
| 2-EHA | 2-ethylhexyl acrylate | |
| IRGACURE 651 | 2,2 dimethoxy-2-phenylacetophenone | Ciba Specialty Chemicals Corp. (Tarrytown, NY) |
| IOTG | isooctyl thioglycolate | |
| KRATON 1161-D | SIS linear block copolymer (15% S, 19% diblock) | Kraton Polymers, Inc. (Houston, Texas) |
| SANTICIZER 141 | 2-ethylhexyl diphenyl phosphate | Ferro Co. (Bridgeport, New Jersey) |
| ESCOREZ 1310LC | aliphatic C-5 tackifying resin | ExxonMobil Chemical LTD. (Southampton, Hampshire, GB) |
| 4900 CMB | Black pigment having a 50/50 blend of carbon black in ethylene vinyl acetate copolymer resin having a melt index of about 150 | MA Hanna Color (Suwanee, Georgia) |
| SUPERESTER W-115 | stabilized rosin acid ester | Arakawa Chemical USA (Chicago, IL) |
| IRGANOX 1010 | Pentaerythritol tetrakis (3-(3,5-di-tert-butyl-4-hydroxyphenyl)proprionate | Ciba Specialty Chemical Co. (Tarrytown, NY) |
| TINUVIN 328 | 2-(2-hydroxy-3,5-di-(tert)-amylphenyl)benzotriazole | Ciba Special Chemicals Co. (Tarrytown, NY) |
| REGALITE R1125 | Hydrogenated hydrocarbon resin | Eastman Chemical Co. (Kingsport, TN) |
| CUMAR 130 | Aromatic thermoplastic resin | Neville Chemical Co. (Pittsburgh, PA) |
| NYPLAST 222B | Naphthenic oil plasticizer | Nynas Naphthenics AB (Stockholm, Sweden) |
| INDOPOL H-8 | Polybutene plasticizer | BP Amoco Chemicals (Naperville, IL) |

Preparation of Acrylic Polymers

Acrylic Polymer 1 (AP-1) was prepared by mixing 45 parts of IOA; 45 parts of BA; 10 parts of AA; 0.15 part IRGACURE 651; and 0.06 part of IOTG. Discreet film packages were formed from a packaging film (0.0635 mm thick ethylene vinyl acetate copolymer film sold as VA-24 Film from CT Film, Dallas, Tex.). The AP-1 composition was sealed into the film packages, which measured approximately 10 centimeters (cm) by 5 cm by 0.5 cm thick. While immersed in a water bath maintained between about 21° C. and about 32° C., the packages were exposed to ultraviolet (UV) radiation having an intensity of about 3.5 milliWatts per square centimeter (mW/sq cm), and a total energy of about 1680 milliJoules per square centimeter (mJ/sq cm) as measured in NIST units. The method of forming the packages and curing are described in Example 1 of U.S. Pat. No. 5,804,610, the subject matter of which is incorporated herein by reference in its entirety.

Acrylic Polymer 2 (AP-2) was prepared according to the procedure for AP-1, except that 85 parts of 2-EHA; 15 parts of AA; 0.15 parts of IRGACURE 651; and 0.8 part IOTG were used. Similarly, Acrylic Polymer 3 (AP-3) was prepared according to the procedure for Acrylic Polymer 1 except that the composition was 95 parts of 2-EHA; 5 parts of AA; 0.15 part IRGACURE 651; and 0.03 part of IOTG. AP-2 and AP-3 were placed in packages and exposed to UV energy, according to the procedure for AP-1.

First Skin Adhesive

Pressure-sensitive adhesives according to the compositions shown in Table 2 were compounded using a 60 mm, co-rotating twin screw extruder (available from Berstorff), (the "first adhesive extruder"). A polymodal, asymmetric star block copolymer ("PASBC") was prepared according to U.S. Pat. No. 5,393,373, the subject matter of which is hereby incorporated by reference in its entirety. The polymer had number average molecular weights of about 4,000 Dalton and about 21,500 Dalton for the two endblocks, 127,000-147,000 Dalton for the arm, and about 1,100,000 Dalton for the star measured by SEC (size exclusion chromatography) calibrated using polystyrene standards. The polystyrene content was between 9.5 and 11.5 percent by weight. The mole percentage of high molecular weight arms was estimated to be about 30%.

The polymodal asymmetric block copolymer and a linear styrene-isoprene-styrene (SIS) block copolymer (KRATON 1161-D) were dry fed into the first zone of the first adhesive extruder. Using a roll-feed extruder (available from Berstorff), either acrylic polymer AP-1 and AP-2 was heated and fed into the third zone of the first adhesive extruder. Antioxidant (IRGANOX 1010), ultraviolet light absorber (TINUVIN 328), pigmented EVA (4900 CMB) were dry fed; and (REGALITE R1125); (CUMAR 130); and (NYPLAST 222B) were melt fed in to various zones of the first adhesive extruder.

TABLE 2

First skin adhesive compositions (Weight Percent).

| | First skin adhesive | | | | | |
|---|---|---|---|---|---|---|
| | Adh-1 | Adh-2 | Adh-3 | Adh-4 | Adh-5 | Adh-6 |
| PASBC* | 31.44 | 30.52 | 31.16 | 32.19 | 30.85 | 30.85 |
| KRATON 1161D | 13.47 | 13.08 | 13.35 | 13.80 | 13.22 | 13.22 |
| REGALITE R1125 | 24.92 | 25.90 | 26.44 | 31.90 | 26.17 | 26.17 |
| CUMAR 130 | 16.62 | 17.26 | 17.63 | 10.64 | 17.45 | 17.45 |

TABLE 2-continued

|  | | | | | | |
|---|---|---|---|---|---|---|
| NYPLAST 222B | 6.50 | 6.24 | 6.37 | 5.34 | 0 | 0 |
| INDOPOL H-8 | 0 | 0 | 0 | 0 | 6.31 | 6.31 |
| IRGANOX 1010 | 1.34 | 1.31 | 1.34 | 1.38 | 1.32 | 1.32 |
| TINUVIN 328 | 1.34 | 1.31 | 1.34 | 1.38 | 1.32 | 1.32 |
| 4900 CMB | 0.38 | 0.38 | 0.38 | 0.37 | 0.37 | 0.37 |
| AP-1 | 4.00 | 4.00 | 2.00 | 0 | 0 | 0 |
| AP-2 | 0 | 0 | 0 | 3.00 | 3.00 | 3.00 |

Pressure sensitive adhesive compositions (Weight Percent).

| | First skin adhesive | | | | |
|---|---|---|---|---|---|
|  | Adh-7 | Adh-8 | Adh-9 | Adh-10 | Adh-11 |
| PASBC* | 29.59 | 31.30 | 31.93 | 32.23 | 31.93 |
| Kraton 1161-D | 12.62 | 13.34 | 13.63 | 13.77 | 13.63 |
| REGALITE R1125 | 29.32 | 30.85 | 31.51 | 31.85 | 31.51 |
| CUMAR 130 | 9.77 | 10.28 | 10.50 | 10.61 | 10.50 |
| NYPLAST 222B | 7.90 | 7.19 | 7.34 | 7.42 | 7.34 |
| INDOPOL H-8 | 0 | 0 | 0 | 0 | 0 |
| IRGANOX 1010 | 1.26 | 1.32 | 1.35 | 1.37 | 1.35 |
| TINUVIN 328 | 1.26 | 1.32 | 1.35 | 1.37 | 1.35 |
| CMB 4900 | 0.37 | 0.38 | 0.38 | 0.37 | 0.38 |
| AP-1 | 0 | 0 | 0 | 0 | 0 |
| AP-2 | 7.92 | 4.00 | 2.00 | 1.00 | 2.00 |

*Polymodal, asymmetric star block copolymer

Comparative First Skin Adhesives CE 1-3

Pressure-sensitive adhesives according to the compositions shown in Table 3 were compounded in the first adhesive extruder, as described above for first skin adhesive Adh-1, with the following exception. These adhesives of these comparative examples did not contain an acrylic polymer; therefore, no acrylic polymer was fed in to the second zone of the extruder.

TABLE 3

Comparative first skin adhesive compositions (Weight Percent).

| | Comparative first skin adhesive | | |
|---|---|---|---|
|  | CE-1 | CE-2 | CE-3 |
| PASBC* | 31.80 | 33.19 | 31.80 |
| Kraton 1161-D | 13.63 | 14.23 | 13.63 |
| Regalite R1125 | 26.98 | 32.89 | 26.98 |
| Cumar 130 | 17.99 | 10.97 | 17.99 |
| Nyplast 222B | 6.50 | 5.50 | 0 |
| Indopol H-8 | 0 | 0 | 6.50 |
| IRGANOX 1010 | 1.36 | 1.42 | 1.36 |
| TINUVIN 328 | 1.36 | 1.42 | 1.36 |
| CMB 4900 | 0.38 | 0.38 | 0.38 |

*Polymodal, asymmetric star block copolymer

Second Skin Adhesive.

A pressure sensitive adhesive was compounded in a 60 mm, co-rotating twin screw extruder (available from Berstorff) (the "second adhesive extruder") in a similar manner as described for the first skin adhesives, except that the composition was as follows: 12.70% of the polymodal, asymmetric star block copolymer (PASBC); 53.10% (by weight) AP-1; 23.30% tackifying resin (ESCOREZ 1310LC); 3.80% tackifying resin (SUPERESTER W115); 6.20% plasticizer (SANTICIZER 141); 0.26% antioxidant (IRGANOX 1010); and 0.25% ultraviolet light absorber (TINUVIN 328).

Double-Sided Foam Tape Samples.

Foam cores (FC1-FC-5) having the compositions shown in Table 4 were compounded according to the following procedure. Black pigmented EVA (4900 CMB) was dry fed in to the first zone of a 90 mm, co-rotating twin screw extruder (the "core extruder") (available from Berstorff, Hannover, Germany). Using a roll-feed extruder (available from Berstorff), both acrylic polymers AP-2 and AP-3 were heated and fed into the second zone of the core extruder. DUALITE U010-185D expandable microspheres (expandable microspheres having a shell composition containing acrylonitrile and methacrylonitrile and a core of isopentane, available from Henkel Corporation (Gulph Mills, Pa.)) were fed into the ninth zone of the core extruder.

TABLE 4

Foam core compositions and properties.

| | Component Parts By Weight Percent (%) | | | | Foam Density g/cm$^3$ | Thickness mm |
|---|---|---|---|---|---|---|
| Composition | AP-3 | AP-2 | Microspheres | Pigment | | |
| FC-1 | 91.82 | 4.8 | 3 | 0.38 | 0.53 | 0.99 |
| FC-2 | 90.22 | 6.6 | 2.8 | 0.38 | 0.55 | 0.99 |
| FC-3 | 86.33 | 9.59 | 3.7 | 0.38 | 0.55 | 0.98 |
| FC-4 | 84.73 | 9.59 | 5.3 | 0.38 | 0.51 | 0.99 |
| FC-5 | 94.32 | 0 | 5.3 | 0.38 | 0.51 | 0.99 |

Three-layer co-extruded tape samples were prepared by coextruding a first skin adhesive layer, a foam core layer as the middle layer, and a second skin adhesive layer. Examples 1-11 use exemplary adhesives according to some embodiments of the present disclosure (Adh-1 through Adh-11). Reference examples 1-3 use comparative adhesive CE-1 through CE-3. The tape constructions are described in Table 5.

The second skin adhesive was compounded in the second adhesive extruder, as described above, and fed through an outer layer of a three-layer, multi-manifold film die obtained from Cloeren Inc. (Orange, Tex.). A foam core layer was compounded in the core extruder, as described above, and fed to the center layer of the three-layer die. A first skin adhesive was compounded in the first adhesive extruder, as described above, and fed to the outer layer of the three-layer die, opposite the second skin adhesive.

Upon exiting the die, the co-extruded layers were cast onto a silicone release coated casting roll. The roll was cooled with water having a temperature of about 12° C. The cooled extrudate was transferred from the casting roll to a 0.117 mm thick two-side silicone coated polyethylene release liner that was transported at the same speed as the casting roll to the end of the web transport line. The first skin adhesive was in contact with the liner after the transfer whereas the second skin adhesive was open to the air. The liner had differential release properties which allow the tape to be unrolled after winding without liner confusion. Release liners are well-known in the art, and any known release liner may be used. Typically, the release liner comprises a film or paper substrate coated with a release material. Commercially available release liners include, but are not limited to, silicone coated papers, and silicone coated films, such as polyester films. Suitable release liners are also disclosed in U.S. Pat. Nos. 6,835,422; 6,805,933; 6,780,484; and 6,204,350 assigned to 3M Innovative Properties Company.

The foam core and both adhesive skins were crosslinked on-web using electron beam curing while supported on the liner. Two sequential irradiation steps acting on opposite faces of the tape were employed. The first skin adhesive was irradiated through the polyethylene liner, whereas the second skin adhesive was irradiated in an open-face condition. The electron beam units were BROADBAND curtain-type electron beam processors (PCT Engineered Systems, LLC., Davenport, Iowa), operated according the acceleration voltage and dose conditions provided in Table 5.

1 had a measured surface energy (Accu-Dyne solutions) of 33 dynes/cm, and Test Surface 2 had a measured surface energy of 32 dynes/cm.

After applying the test tape to the test surface, the samples were conditioned prior to testing. First, the samples were conditioned at room temperature for three days. Next, the samples were conditioned at 38° C. and 100% relative

TABLE 5

Compositions of three-layer tape samples.

| Ex. | First skin adhesive | Acrylic Polymer (wt. %) | Foam Core | First skin adhesive Acceleration voltage (keV) | Dose (Mrad) | Second skin adhesive Acceleration voltage (keV) | Dose (Mrad) |
|---|---|---|---|---|---|---|---|
| 1 | Adh-1 | 4 | FC-1 | 247 | 11.5 | 235 | 10 |
| 2 | Adh-2 | 4 | FC-2 | 247 | 11.5 | 235 | 10 |
| 3 | Adh-3 | 2 | FC-2 | 247 | 11.5 | 235 | 10 |
| 4 | Adh-4 | 3 | FC-3 | 250 | 10 | 230 | 10 |
| 5 | Adh-5 | 3 | FC-3 | 250 | 10 | 230 | 10 |
| 6 | Adh-6 | 3 | FC-3 | 275 | 7 | 230 | 10 |
| 7 | Adh-7 | 7.9 | FC-4 | 250 | 9 | 230 | 10 |
| 8 | Adh-8 | 4 | FC-4 | 250 | 9 | 230 | 10 |
| 9 | Adh-9 | 2 | FC-4 | 250 | 9 | 230 | 10 |
| 10 | Adh-10 | 1 | FC-4 | 250 | 9 | 230 | 10 |
| 11 | Adh-11 | 2 | FC-5 | 250 | 9 | 230 | 10 |
| RE-1 | CE-1 | 0 | FC-2 | 247 | 11.5 | 235 | 10 |
| RE-2 | CE-2 | 0 | FC-3 | 245 | 11.5 | 230 | 10 |
| RE-3 | CE-3 | 0 | FC-3 | 245 | 11.5 | 230 | 10 |

The cured adhesive tapes were tested for adhesion to low surface energy automotive paints according to the "Breakaway and Continuous Peel Adhesion" (BACP), METHOD described in Ford Motor Co. Specification WSB-M3G138-B. Tensile testing was carried out using an MTS Model 1122 tensile tester (MTS Systems Corp., Eden Prairie, Minn.) equipped with TestWorks 4 software programmed to calculate the breakaway load value, averaged continuous peel value, and total energy.

The test surfaces were steel panels painted with automotive paint systems comprising a base electrocoat, pigmented basecoat, and a low surface energy, carbamate-crosslinked unpigmented acrylic-based clearcoat. The experimental tapes were adhered to the clearcoat for testing. Test Surface humidity for six days. Four samples were tested for each tape, and the average result is reported in Table 6. The observed failure mode(s) for each set of samples is also reported in Table 6.

| Number | Failure mode |
|---|---|
| 1 | Foam split |
| 2 | Combination of foam split and clean removal |
| 3 | Pop-off |

TABLE 6

Compositions of three-layer tape samples.

| Ex. | First skin adhesive | Acrylic Polymer (wt. %) | Test surface | Breakaway Load (Newtons) | Peel (N/cm) | Peel Failure Mode | Total Energy (N · cm) |
|---|---|---|---|---|---|---|---|
| 1 | Adh-1 | 4 | 1 | 122.1 | 48.4 | 1 | 764 |
| 2 | Adh-2 | 4 | 1 | 126.7 | 51.2 | 1 | 803 |
| 3 | Adh-3 | 2 | 1 | 130.9 | 49.7 | 1 | 787 |
| RE-1 | CE-1 | 0 | 1 | 120.4 | 31.2 | 1.2 | 503 |
| 4 | Adh-4 | 3 | 1 | 99.2 | 45.7 | 1 | 693 |
| 5 | Adh-5 | 3 | 1 | 109.3 | 49.0 | 1 | 797 |
| 6 | Adh-6 | 3 | 1 | 98.4 | 43.4 | 1 | 662 |
| RE-2 | CE-2 | 0 | 1 | 88.0 | 18.5 | N/A | N/A |
| RE-3 | CE-3 | 0 | 1 | 75.7 | 17.5 | 3 | 285 |
| 7 | Adh-7 | 7.9 | 1 | 102.5 | 51.7 | 1.3 | 770 |
| 8 | Adh-8 | 4 | 1 | 105.1 | 50.6 | 1 | 760 |
| 9 | Adh-9 | 2 | 1 | 104.4 | 53.4 | 1.3 | 796 |
| 10 | Adh-10 | 1 | 1 | 103.0 | 54.1 | 1 | 801 |
| 11 | Adh-11 | 2 | 1 | 93.0 | 37.8 | 1 | 588 |
| 12 | Adh-1 | 4 | 2 | 126.6 | 49.1 | 1 | 780 |
| 13 | Adh-2 | 4 | 2 | 131.6 | 51.4 | 1 | 812 |
| 14 | Adh-3 | 2 | 2 | 127.8 | 53.2 | 1 | 830 |
| RE-4 | CE-1 | 0 | 2 | 127.5 | 50.7 | 1 | 796 |

Various modifications and alterations of this invention will become apparent to those skilled in the art without departing from the scope and spirit of this invention.

What is claimed is:

1. A pressure sensitive adhesive composition comprising:
   (A) 92 to 99.9 parts of a block copolymer adhesive composition comprising:
      (a) a first block copolymer comprising
         (i) at least one rubbery block comprising a first polymerized conjugated diene, a hydrogenated derivative thereof, or combinations thereof; and
         (ii) at least one glassy block comprising a first polymerized monovinyl aromatic monomer; and
   (B) 1 to less than 8 parts of an acrylic adhesive composition comprising:
      (i) 70 to 100 parts of at least one acrylic or methacrylic ester of a non-tertiary alkyl alcohol, wherein the non-tertiary alkyl alcohol contains 4 to 20 carbon atoms; and
      (ii) 10 to 30 parts of a copolymerized reinforcing monomer.

2. The pressure sensitive adhesive according to claim 1, wherein the first block copolymer is a multi-arm block copolymer of the formula $Q_n$-Y, wherein:
   (a) Q represents an arm of the multi-armw block copolymer and each arm independently has the formula R-G, wherein:
      (i) R represents the rubbery block; and
      (ii) G represents the glassy block;
   (b) n represents the number of arms and is a whole number of at least 3; and
   (c) Y is a residue of a multifunctional coupling agent.

3. The pressure sensitive adhesive according to claim 2, wherein the block copolymer adhesive composition further comprises (b) a second block copolymer comprising at least one rubbery block comprising a polymerized second conjugated diene, a hydrogenated derivative thereof, or combinations thereof and at least one glassy block comprising a second polymerized monovinyl aromatic monomer.

4. The pressure sensitive adhesive according to claim 3, wherein the second block copolymer is a linear block copolymer.

5. The pressure sensitive adhesive according to claim 4, wherein the second block copolymer is a copolymer selected from the group consisting of styrene-isoprene-styrene, styrene-butadiene-styrene, styrene-ethylene-butadiene-styrene, and combinations thereof.

6. The pressure sensitive adhesive according to claim 4, wherein a ratio of multi-arm block copolymers to linear block copolymers ranges from 1.5:1 to 9:1.

7. The pressure sensitive adhesive according to claim 4, wherein the first block copolymer is a polymodal, asymmetric star block copolymer.

8. The pressure sensitive adhesive according to claim 4, wherein the block copolymer adhesive composition further comprises a first high Tg tackifier having a Tg of at least 60 degrees C., wherein the first high Tg tackifier is compatible with at least one rubbery block.

9. The pressure sensitive adhesive according to claim 8, wherein the block copolymer adhesive composition further comprises a second high Tg tackifier having a Tg of at least 60 degrees C., wherein the second high Tg tackifier is compatible with the at least one glassy block.

10. The pressure sensitive adhesive according to claim 8 wherein a ratio of a total amount of high Tg tackifiers to block copolymers ranges from 0.8:1 to 1.25:1.

11. The pressure sensitive adhesive according to claim 8 wherein a ratio of the rubbery block compatible high Tg tackifier to the glassy block compatible high Tg tackifier ranges from 1:1 to 9:1.

12. The pressure sensitive adhesive according to claim 1, wherein the first block copolymer is a polymodal, asymmetric star block copolymer.

13. The pressure sensitive adhesive according to claim 1, wherein the block copolymer adhesive composition further comprises a first high Tg tackifier having a Tg of at least 60 degrees C., wherein the first high Tg tackifier is compatible with at least one rubbery block.

14. The pressure sensitive adhesive according to claim 13, wherein the block copolymer adhesive composition further comprises a second high Tg tackifier having a Tg of at least 60 degrees C., wherein the second high Tg tackifier is compatible with the at least one glassy block.

15. The pressure sensitive adhesive according to claim 13 wherein a ratio of the total amount of high Tg tackifiers to block copolymers ranges from 0.8:1 to 1.25:1.

16. The pressure sensitive adhesive according to claim 13 wherein a ratio of the rubbery block compatible high Tg tackifier to the glassy block compatible high Tg tackifier ranges from 1:1 to 9:1.

17. A tape comprising a foam backing having a first major surface and a second major surface; and a first adhesive skin bonded to the first major surface, wherein the first adhesive skin comprises a first pressure sensitive adhesive comprising
   (A) 92 to 99.9 parts of a block copolymer adhesive composition comprising:
      (a) a first block copolymer comprising
         (i) at least one rubbery block comprising a first polymerized conjugated diene, a hydrogenated derivative thereof, or combinations thereof; and
         (ii) at least one glassy block comprising a first polymerized monovinyl aromatic monomer; and
   (B) 1 to less than 8 parts of an acrylic adhesive composition comprising:
      (i) 70 to 100 parts of at least one acrylic or methacrylic ester of a non-tertiary alkyl alcohol, wherein the non-tertiary alkyl alcohol contains 4 to 20 carbon atoms; and
      (ii) 10 to 30 parts of a copolymerized reinforcing monomer.

18. The tape of claim 17, wherein the first block copolymer is a multi-arm block copolymer of the formula $Q_n$-Y, wherein:
   Q represents an arm of the multi-arm block copolymer and each arm independently has the formula R-G, wherein:
      (i) R represents the rubbery block; and
      (ii) G represents the glassy block;
   n represents the number of arms and is a whole number of at least 3; and
   Y is a residue of a multifunctional coupling agent; and
   wherein the block copolymer adhesive composition further comprises (b) a second block copolymer comprising at least one rubbery block comprising a polymerized second conjugated diene, a hydrogenated derivative thereof, or combinations thereof; and at least one glassy block comprising a second polymerized monovinyl aromatic monomer, and wherein the second block copolymer is a linear block copolymer.

19. A pressure sensitive adhesive composition comprising:
(A) 92 to 99.9 parts of a block copolymer adhesive composition comprising:
 (a) a first block copolymer comprising
  (i) at least one rubbery block comprising a first polymerized conjugated diene, a hydrogenated derivative thereof, or combinations thereof; and
  (ii) at least one glassy block comprising a first polymerized monovinyl aromatic monomer; and
(B) 1 to less than 5 parts of an acrylic adhesive composition comprising:
 (i) 70 to 100 parts of at least one acrylic or methacrylic ester of a non-tertiary alkyl alcohol, wherein the non-tertiary alkyl alcohol contains 4 to 20 carbon atoms; and
 (ii) 10 to 30 parts of a copolymerized reinforcing monomer.

\* \* \* \* \*

UNITED STATES PATENT AND TRADEMARK OFFICE
CERTIFICATE OF CORRECTION

PATENT NO. : 9,556,367 B2  
APPLICATION NO. : 14/484952  
DATED : January 31, 2017  
INVENTOR(S) : Robert Waid Page 1 of 1

It is certified that error appears in the above-identified patent and that said Letters Patent is hereby corrected as shown below:

In the Specification

Column 9
Line 58, delete "with out" and insert -- without --

Columns 11-12
Line 25, Table 1, delete "proprionate" and insert -- propionate --

In the Claims

Column 17
Line 26, in Claim 2, delete "multi-armw" and insert -- multi-arm --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*